(12) United States Patent
Carlhoff et al.

(10) Patent No.: US 10,899,366 B2
(45) Date of Patent: Jan. 26, 2021

(54) METHOD TO ASSIST CONTROL OF A VEHICLE ASSISTANCE SYSTEM

(71) Applicant: Ford Global Technologies, LLC, Dearborn, MI (US)

(72) Inventors: Philipp Carlhoff, Herzogenrath (DE); Meghashree Kowshika Ramachandra, Aachen (DE); Georg Neugebauer, Herzogenrath (DE); Stephan Strahl, Bodenwoehr Bayern (DE)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 15/977,654

(22) Filed: May 11, 2018

(65) Prior Publication Data
US 2018/0334174 A1    Nov. 22, 2018

(30) Foreign Application Priority Data

May 18, 2017    (DE) .......................... 10 2017 208 386

(51) Int. Cl.
| | |
|---|---|
| *B60W 50/14* | (2020.01) |
| *B60W 50/08* | (2020.01) |
| *B60W 30/09* | (2012.01) |
| *B60W 40/04* | (2006.01) |
| *B60W 30/18* | (2012.01) |
| *B60W 50/00* | (2006.01) |

(52) U.S. Cl.
CPC ............ *B60W 50/14* (2013.01); *B60W 30/09* (2013.01); *B60W 30/18154* (2013.01); *B60W 40/04* (2013.01); *B60W 50/082* (2013.01); *B60W 2050/0072* (2013.01); *B60W 2050/146* (2013.01); *B60W 2554/00* (2020.02)

(58) Field of Classification Search
CPC ............... B60W 50/14; B60W 50/082; B60W 30/18154; B60W 40/04; B60W 30/09; B60W 2554/00; B60W 2050/0072; B60W 2050/146; B60W 30/08; G08G 1/16
USPC ....................................................... 701/1, 70
See application file for complete search history.

(56) References Cited

U.S. PATENT DOCUMENTS

| | | | | | |
|---|---|---|---|---|---|
| 6,072,409 | A | * | 6/2000 | Fushimi ................. | G01C 21/32 340/990 |
| 8,027,762 | B2 | * | 9/2011 | Otake .................... | G08G 1/164 701/23 |
| 8,265,861 | B2 | | 9/2012 | Ikeda et al. | |
| 8,676,500 | B1 | * | 3/2014 | Walsh ................ | G08G 1/09626 370/329 |

(Continued)

FOREIGN PATENT DOCUMENTS

| | | |
|---|---|---|
| DE | 102004057745 A1 | 7/2005 |
| DE | 102005023185 A1 | 11/2006 |

(Continued)

*Primary Examiner* — Jaime Figueroa
(74) *Attorney, Agent, or Firm* — Brooks Kushman P.C.; Frank Lollo

(57) ABSTRACT

A method to assist with control of a vehicle in road traffic is provided. Parameters including a distance, direction and speed of other road users are detected. The parameters are used to determine a strategy for the driver to start an intended control action. A time window is determined that enables the driver to start the intended control action and is displayed in a graphical representation to scale to the driver through a driver-vehicle interface.

20 Claims, 3 Drawing Sheets

(56) References Cited

U.S. PATENT DOCUMENTS

| | | | |
|---|---|---|---|
| 8,751,103 B2* | 6/2014 | Hukkeri | G01S 7/4876 |
| | | | 701/36 |
| 9,146,898 B2* | 9/2015 | Ihlenburg | G06F 17/00 |
| 9,218,739 B2* | 12/2015 | Trombley | G08G 1/09626 |
| 9,604,641 B2* | 3/2017 | Al-Stouhi | B60W 10/18 |
| 9,779,624 B2* | 10/2017 | Lefevre | G08G 1/166 |
| 9,824,583 B2* | 11/2017 | Popple | G08G 1/096725 |
| 10,240,933 B2* | 3/2019 | Grinenval | B60W 10/11 |
| 2002/0036584 A1* | 3/2002 | Jocoy | G01S 13/931 |
| | | | 342/70 |
| 2006/0025897 A1* | 2/2006 | Shostak | G08G 1/017 |
| | | | 701/1 |
| 2008/0162027 A1* | 7/2008 | Murphy | G05D 1/0246 |
| | | | 701/117 |
| 2010/0201508 A1 | 8/2010 | Green et al. | |
| 2010/0211270 A1* | 8/2010 | Chin | B62D 6/007 |
| | | | 701/44 |
| 2010/0253539 A1* | 10/2010 | Seder | G01S 13/87 |
| | | | 340/903 |
| 2012/0041632 A1 | 2/2012 | Bordes | |
| 2013/0282357 A1* | 10/2013 | Rubin | G01C 21/26 |
| | | | 703/22 |
| 2015/0105936 A1* | 4/2015 | Grinenval | B60W 30/10 |
| | | | 701/1 |
| 2015/0106007 A1* | 4/2015 | Matsumura | G01C 21/26 |
| | | | 701/408 |
| 2016/0203719 A1 | 7/2016 | Divekar et al. | |
| 2016/0221575 A1* | 8/2016 | Posch | B60W 30/14 |
| 2016/0229409 A1* | 8/2016 | Pascheka | B60W 50/0097 |
| 2016/0275797 A1* | 9/2016 | Lefevre | B60Q 5/006 |
| 2016/0357188 A1* | 12/2016 | Ansari | G06K 9/00805 |
| 2017/0088053 A1* | 3/2017 | Orellana | B60R 1/12 |
| 2017/0124869 A1* | 5/2017 | Popple | G08G 1/087 |
| 2017/0369055 A1* | 12/2017 | Saigusa | G08G 1/0116 |
| 2018/0268699 A1* | 9/2018 | Ohsawa | B60W 30/0956 |
| 2018/0286242 A1* | 10/2018 | Talamonti | G08G 1/096822 |
| 2018/0322784 A1* | 11/2018 | Schild | G08G 1/166 |

FOREIGN PATENT DOCUMENTS

| | | |
|---|---|---|
| DE | 102011010864 A1 | 12/2011 |
| DE | 102013225057 A1 | 6/2015 |
| DE | 102015204122 A1 | 11/2015 |

* cited by examiner

METHOD TO ASSIST CONTROL OF A VEHICLE ASSISTANCE SYSTEM

CROSS-REFERENCE TO RELATED APPLICATIONS

This application claims foreign priority benefits under 35 U.S.C. § 119(a)-(d) to DE Application 10 2017 208 386.7 filed May 18, 2017, which is hereby incorporated by reference in its entirety.

TECHNICAL FIELD

The disclosure concerns a method and system to assist control of a vehicle in road traffic, wherein parameters of other road users are detected.

BACKGROUND

Road traffic requires a high level of attentiveness from each road user. In particular, crossing heavily used intersections and merging into passing traffic from rest mean special challenges for drivers of vehicles. Thus, it is sometimes difficult for drivers to estimate a distance and speed of other road users, for example vehicles that are approaching on a road onto which the driver wishes to drive. This also particularly applies to situations in which other road users cannot be detected well by the driver because of other vehicles or concealing structures. There are approaches for warning drivers of hazardous situations in relation to other road users and possibly to initiate emergency braking (US 2010 0 201 508 A1, US 2012 0 041 632 A1). Said conventional approaches are however insufficient to provide drivers with an adequate overview, for example when driving onto a road.

SUMMARY

It is therefore the object to assist the driver of a vehicle in estimating the traffic.

A first aspect of the disclosure concerns a method to assist control of a first vehicle in road traffic using a system comprising at least one device to detect a presence and parameters of at least one further road user, at least one control device and at least one driver-vehicle interface that informs the driver about a traffic situation, comprising the steps:

detecting a specific intention of the driver to control the first vehicle, using the device to detect the presence of at least one further road user, detecting at least a distance, direction and speed of the further road user using the device, calculating a strategy for the driver to start an intended control action by the control device, and representing a traffic situation to the driver via the interface, wherein a time window is determined that enables the driver to start to participate in traffic.

The method according to the disclosure is advantageous since the driver is shown a time window in which driving from a static position onto a road is possible without endangering himself or other road users. In other words, the driver is notified whether there is enough space in the traffic flow to drive and when driving is not favorable.

A vehicle driven by the driver is understood here to be the first vehicle. It is the vehicle from which the method is carried out.

Other road users include land vehicles, for example in particular motor vehicles, rail vehicles, motor cycles and wagons, and pedestrians that potentially interfere with participation in traffic by the first vehicle.

A specific intention of the driver is to be understood as the driver both intending to drive straight over an intersection and to drive onto a road or to turn into a road. Said specific intention can be derived from the vehicle engaging first gear in a stationary position and/or from driving onto or turning into a road being indicated by operating turn indicators.

A device that determines the presence and parameters of at least one further road user is a device that is designed to detect other road users and motion parameters thereof. In this case, the parameters include a direction of motion, a distance and speed. The direction of motion and the speed are in this case parameters of the other road users, and the distance relates to the first vehicle.

At least one sensor that is disposed on the vehicle is preferably used as the device to detect the presence and motion parameters of other road users. In this case, it is important that the sensors are embodied to be able to detect the distance and the speed of other road users, especially of motor vehicles. In this case a camera, especially a stereo camera, and RADAR-based and LIDAR-based sensors are used as sensors for example.

The driver-vehicle interface, briefly the interface, is for example a display that provides the driver with visual information.

Likewise, vehicle-to-vehicle communications (vehicle-to-vehicle, v2v) are preferably used as a device to detect the presence and motion parameters of other road users. The v2v communications can be established on their own or even in combination with the aforementioned sensors. Furthermore, vehicle-to-infrastructure communications (vehicle-to-infrastructure, v2i) can also be advantageously used to determine the presence and motion parameters of other road users, either alone or in combination with the aforementioned v2v communications or sensors. In this case, the operation of v2v and v2i communications are known to the person skilled in the art.

Particularly preferably, in the method a backward-running timer (countdown) is displayed to the driver on the interface that indicates a temporal profile of a favorable participation in traffic. In this way, an opportunity to drive on is advantageously indicated to the driver. In this way, a countdown can start with an appearance of an interval, i.e. can start when sufficient distance from a next road user is detected, and ends when the distance is too short to ensure a safe approach. However, the countdown can also start before a favorable interval appears, for example by detecting a distance between a plurality of road users. In this case, the countdown ends when the interval starts. Different countdowns can also be running, for example one until an occurrence of an interval and one until an end of the interval. In addition to the display on the interface, the countdown can also be arranged so that the interface comprises a corresponding loudspeaker output.

The interface display is preferably supported by at least one audio signal. In this case, different audio signals can assist in different situations. In particular, a certain audio signal can be provided for a situation in which driving is unfavorable, and another defined audio signal for a situation in which driving is favorable, i.e. there is a favorable interval to the next road user or between two of a plurality of road users.

A traffic situation can preferably be graphically represented by the interface. In doing so, ideally a road situation is represented, wherein further road users with their distances from the vehicle and from each other are shown to scale. The graphical representation can be used on its own or in combination with the display of a countdown or an audio signal.

Furthermore, the representation of the road situation is additionally supported in color by the interface in the method. In doing so, for example the countdown can be highlighted in color or the countdown can be highlighted with different colors for different situations. Different messages sent via the interface to the driver can be characterized by different colors, for example red for a stop signal.

It is also preferable in the method if an emergency braking system is activated if the driver carries out an action that would result in a collision with another road user.

A second aspect of the disclosure concerns a system for carrying out the method according to the disclosure, comprising at least one device to detect other road users, at least one control device and at least one driver-vehicle interface that informs the driver about the traffic situation. The advantages of the system correspond to the advantages of the method.

A third aspect of the disclosure concerns a motor vehicle with a system according to the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
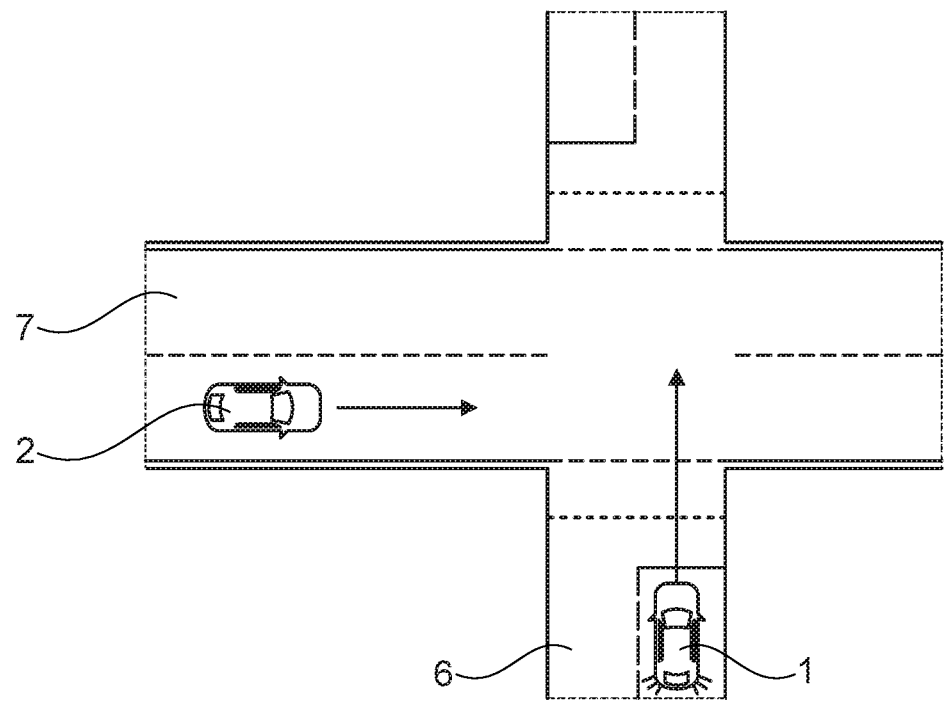
FIG. 1 shows a representation of a traffic situation for carrying out the method according to the disclosure.
Figure 2:
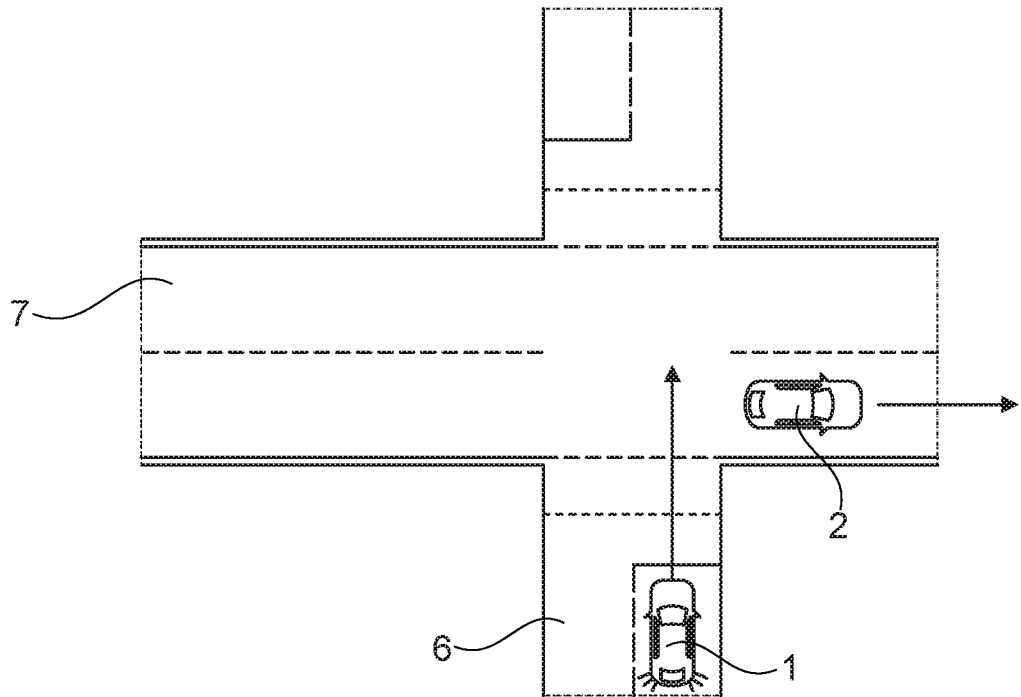
FIG. 2 shows a representation of a traffic situation for carrying out the method according to the disclosure.
Figure 3:
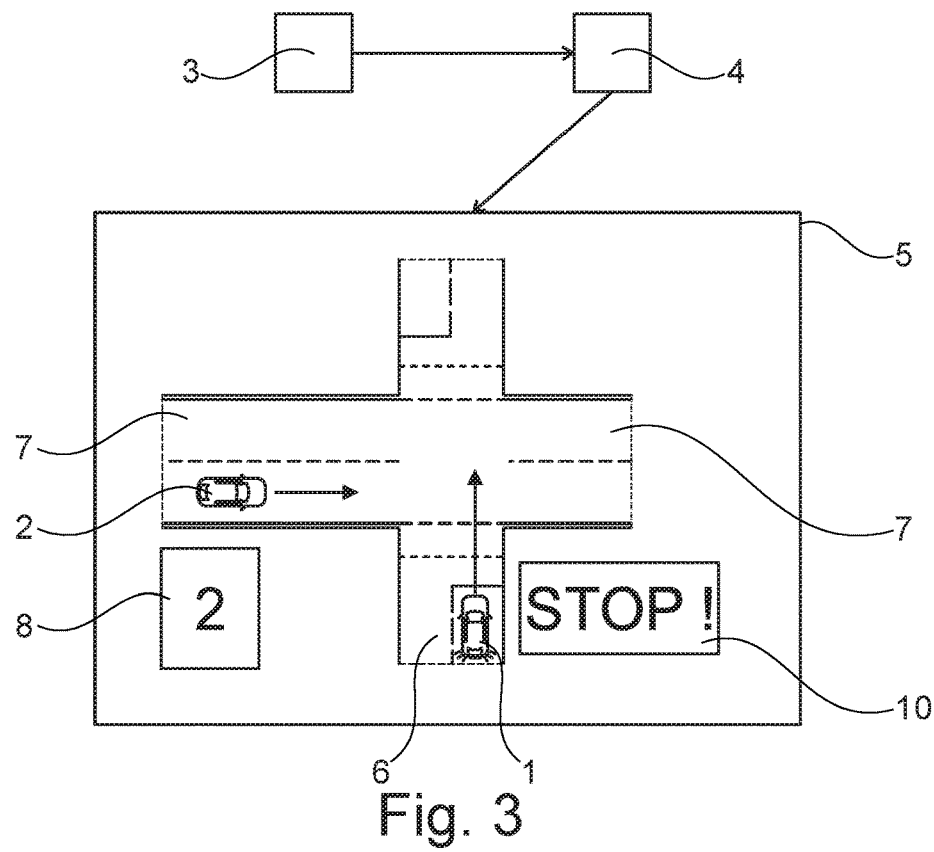
FIG. 3 shows a schematic representation of an embodiment of a system according to the disclosure.
Figure 4:
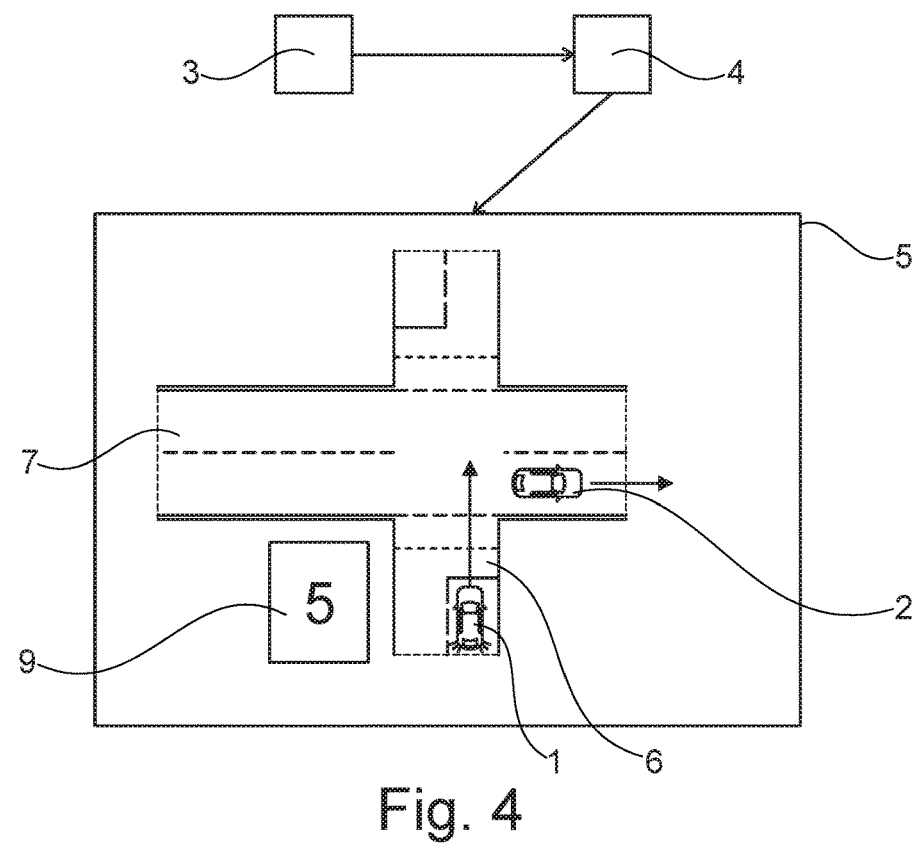
FIG. 4 shows a schematic representation of an embodiment of a system according to the disclosure.

The method according to the disclosure is carried out with a first vehicle 1 (FIGS. 1 and 2). In FIGS. 1 and 2, the first vehicle 1 is a limousine, a driver (not shown) of which intends to cross an intersection formed by crossing a main road 7 and a secondary road 6. The first vehicle 1 comprises a system to assist control that comprises at least one camera 3, at least one control device 4 and at least one driver-vehicle interface 5 that informs the driver about the traffic situation, which are depicted in FIGS. 3 and 4.

The camera 3 is used to detect a presence and parameters of at least one further road user, which is a second vehicle 2 according to FIGS. 1 and 2. Alternatively, the further road user can also be a pedestrian, or a cyclist instead of a motor vehicle. The camera 3 is a stereo camera for example. The function of the camera 3 can be supported by RADAR-based or LIDAR-based sensors. Alternatively, the RADAR-based or LIDAR-based sensors can also be used without a camera 3. Furthermore, a function of the sensors (including the camera) can be supported by V2V or V2I communications, or the method can be carried out by the communications alone, wherein the first vehicle 1 comprises a suitable device to communicate with other vehicles or infrastructure devices. By way of example, only camera data are referred to below.

In FIG. 1, a situation is represented in which the first vehicle 1 and the second vehicle 2 are at an intersection of two roads 6, 7. The first vehicle 1 is on a secondary road 6 and must give way to the second vehicle 2, which is on a main road 7 that is crossed by the secondary road 6. In FIG. 2, the second vehicle 2 has passed the intersection, so that the first vehicle 1 can approach from the secondary road 6 and can cross the intersection.

Figure 5:
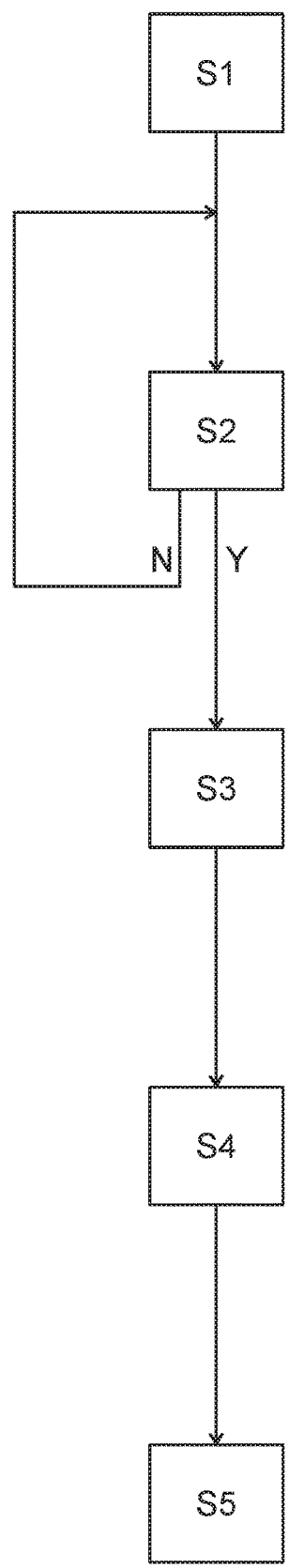
FIG. 5 shows a flow chart of an embodiment of the method according to the disclosure.

In an embodiment of the method according to the representation of FIG. 5, in a first step S1 a specific intention of the driver to steer the vehicle 1 across the intersection is detected. In a second step S2, it is detected via the camera 3 that is disposed on the vehicle whether there are further road users on the main road 7. If a presence of a further road user is not detected (in FIG. 5 N, i.e. No), the method carries out step S2, and a traffic situation continues to be observed. At the same time, the interface signal to the driver that no further road users have been detected and that he can start an intended action. If a further road user is detected, as in the second vehicle 2, in the traffic situation represented in FIG. 1 (Y, i.e. Yes), the method continues to a third step S3. In the third step S3, according to FIG. 3, the control device 4 detects that the second vehicle 2 is moving towards the intersection, a current distance of the second vehicle 2 from the intersection and a speed at which the second vehicle 2 is moving through analysis of the camera data recorded in the temporal profile.

In a fourth step S4, the control device 4 detects that the second vehicle 2 will enter the intersection in less than 2 seconds. From this it is concluded that an immediate start of the first vehicle 1 onto the intersection would result in a collision with the second vehicle 2. The traffic situation is indicated to the driver in a fifth step S5 via the interface, as shown in FIG. 3. In this case, the interface displays a first countdown 8 that counts for example from 2 to 0 and indicates that 2 seconds should be waited before starting. If the second vehicle 2 has passed the intersection, a second countdown 9 is displayed that counts for example from 5 to 0 and that indicates a time window in which the intersection can be crossed safely. The countdown is combined with a graphical representation of a road situation (FIG. 4). The graphical representation of FIG. 3 corresponds to the situation of FIG. 1, and the graphical representation of FIG. 4 corresponds to the situation of FIG. 2.

A stop signal 10 is merged in the interface for a period until reaching the time window for crossing the intersection, which can be carried out or highlighted with a red color. Furthermore, the control device 4 can cause activation of a brake if the driver of the first vehicle 1 wants to steer onto the intersection before the time window to cross has started. When the time window to cross has started, the stop signal is cleared.

The method according to FIG. 5 can also be carried out in the same way for example for driving onto a road from a standstill, or when turning from a secondary road onto a main road. Furthermore, the method according to the disclosure can be used in situations in which a display of time windows is useful, for example when starting in reverse gear, when changing lanes, when parking and similar situations in which assistance systems can be used.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to control a first vehicle comprising:
capturing, via a system having a sensor, a presence and parameters of a further road user;
informing, via a control device and an interface, a driver about a traffic situation;
detecting a specific intention by the driver to control the first vehicle;
detecting a distance, direction and speed of the further road user via the sensor;
calculating a strategy to start an intended control action derived from the specific intention with the control device;
displaying, on the interface, a first time window as a first backward-running timer that indicates to the driver to wait to start the intended control action based on the presence and parameters of the further road user; and
displaying, on the interface, a second time window as a second backward-running timer that indicates a temporal course of participation in traffic to the driver and enables the driver to start the intended control action.

2. The method as claimed in claim 1, wherein the sensor is a camera to capture the presence and parameters of the further road user.

3. The method as claimed in claim 1, wherein the sensor uses vehicle-to-vehicle communications to capture the presence and parameters of the further road user.

4. The method as claimed in claim 1, the first time window is supported by a first audio signal; and
wherein the second time window is supported by a second audio signal.

5. The method as claimed in claim 1 further comprising representing, graphically on the interface, a traffic situation.

6. The method as claimed in claim 5, wherein the traffic situation is represented in color on the interface.

7. The method as claimed in claim 1 further comprising activating an emergency braking system responsive to the intended control action occurring during the first time window.

8. A vehicle assistance system, comprising:
a camera that detects a presence and parameters indicative of a distance, direction and speed of a second vehicle; and
a control device configured to, in response to a specific intention of an intended control action for a first vehicle within a traffic situation, display, on an interface, a first time window as a first backward-running timer to wait to start a strategy for the intended control action based on the presence and parameters of the further road user, and a second time window as a second backward-running timer to start the strategy for the intended control action and indicate a temporal course of participation in the traffic situation to avoid the second vehicle, wherein the strategy is derived from the parameters;
wherein the second time window and second backward-running timer is started at an end of the first time window and the first backward-running timer such that the first time window is indicative of a time to the second time window; and
wherein the control device is configured to, in response to the intended control action being during the first time window, activate an emergency braking system.

9. The vehicle assistance system as claimed in claim 8 further comprising a vehicle-to-vehicle communications system to capture the presence and parameters of the second vehicle.

10. The vehicle assistance system as claimed in claim 8, wherein the control device is configured to output a first audio signal while the first time window is displayed on the interface, and output a second audio signal while the second time window is displayed on the interface.

11. The vehicle assistance system as claimed in claim 8, wherein the control device is configured to output, graphically on the interface, the traffic situation, wherein the traffic situation is represented in color.

12. A vehicle comprising:
an assistance system including a vehicle-to-vehicle communications device that detects presence and parameters indicative of a distance, direction and speed of a second vehicle; and
a control device configured to, in response to a specific intention of an intended control action, detected via the vehicle-to-vehicle communications device, for the vehicle within a traffic situation, display, on an interface, a first time window as a first backward-running timer to wait to start a strategy for the intended control action based on the presence and parameters of the further road user, and display a second time window as a second backward-running timer to start the strategy for the intended control action and indicate a temporal course of participation in the traffic situation to avoid the second vehicle, wherein the strategy is derived from the parameters;
wherein the second time window and second backward-running timer is started at an end of the first time window and the first backward-running timer such that the first time window is indicative of a time to the second time window; and
wherein the control device is configured to, in response to the intended control action being during the first time window, activate an emergency braking system.

13. The vehicle as claimed in claim 12, wherein the assistance system includes a camera to capture the presence and parameters of the second vehicle.

14. The vehicle as claimed in claim 12, wherein the control device is configured to output a first audio signal while the first time window is displayed on the interface, and output a second audio signal while the second time window is displayed on the interface.

15. The vehicle as claimed in claim 12, wherein the control device is configured to output, graphically and in color on the interface, the traffic situation.

16. The method as claimed in claim 1 wherein the second time window and second backward-running timer is started at an end of the first time window and the first backward-running timer such that the first time window is indicative of a time to the second time window.

17. The method as claimed in claim 16 wherein the intention of the driver to control the vehicle is driving from a standstill position onto a road with space to avoid the further road user.

18. The method as claimed in claim 17 wherein the first time window is displayed and the first backward-running timer is started when the distance from the further road user is below a threshold; and wherein the second time window starts and the second backward-running timer is started when the distance from the further road user is above the threshold, and ends when the distance from the further road user is less than the threshold.

19. The method as claimed in claim 18 wherein the intention of the driver to control the vehicle is driving from a standstill position onto a road with space to avoid the further road user.

20. The method as claimed in claim 18 further comprising displaying a stop signal on the interface during the first time window, and clearing the stop signal when the second time window has started.

\* \* \* \* \*